United States Patent [19]

Jacobs et al.

[11] 3,764,565

[45] Oct. 9, 1973

[54] CATALYST FOR HYDROCRACKING A RESID HYDROCARBON

[75] Inventors: Robert B. Jacobs, Homewood; Gerald B. Holkstra, South Holland, both of Ill.

[73] Assignee: Standard Oil Company, Chicago, Ill.

[22] Filed: Apr. 21, 1971

[21] Appl. No.: 136,215

Related U.S. Application Data

[60] Division of Ser. No. 17,454, March 9, 1970, Pat. No. 3,674,680, which is a continuation-in-part of Ser. No. 598,046, Nov. 30, 1966, abandoned.

[52] U.S. Cl.................. 252/470, 252/467, 252/472, 252/477 R
[51] Int. Cl........................... B01j 11/06, B01j 11/22
[58] Field of Search......................... 252/477 R, 470

[56] References Cited
UNITED STATES PATENTS
2,408,164  9/1946  Foster............................ 252/477 R Primary Examiner—Daniel E. Wyman
Assistant Examiner—W. J. Shine
Attorney—John J. Connors

[57] ABSTRACT

A resid hydrocarbon is converted to lower boiling hydrocarbons and/or desulfurized by contacting, in the presence of hydrogen, said resid with a bed of catalyst particles, substantially all of said particles having a surface-to-volume ratio ranging between about 100 and about 250 l/inches, and wherein substantially all points within each of said particles are less than about 0.015 inch from the particle's surface. When one of these particles is circumscribed by a right circular cylinder having an altitude equal to that of the particle, the particle contacts the sidewall of the cylinder at at least three elements and occupies from about 70 to about 90 percent of the cylinder's volume. Preferred particle shapes are clover-leaf, cross, ring and C-shape.

7 Claims, 9 Drawing Figures

PATENTED OCT 9 1973
3,764,565
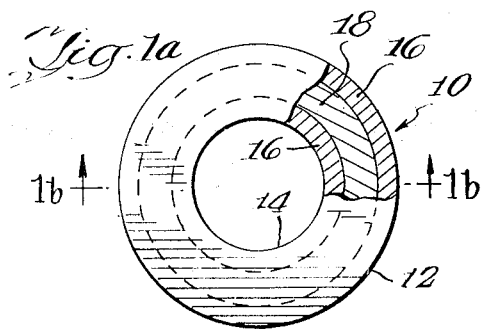
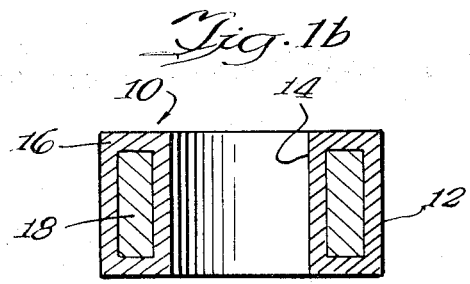
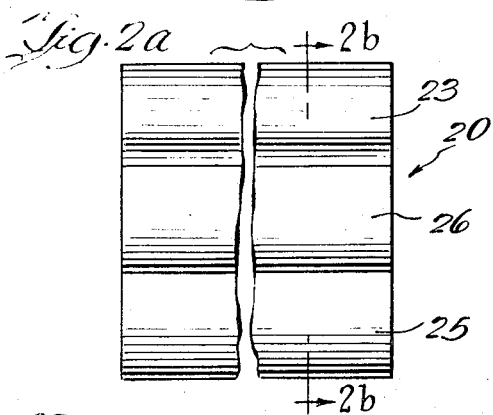
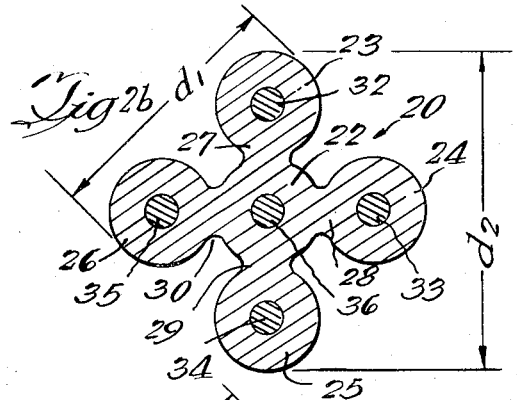
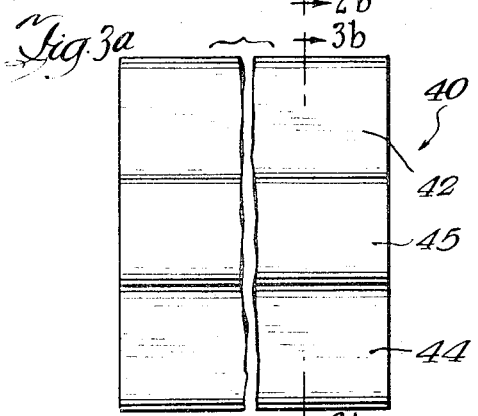
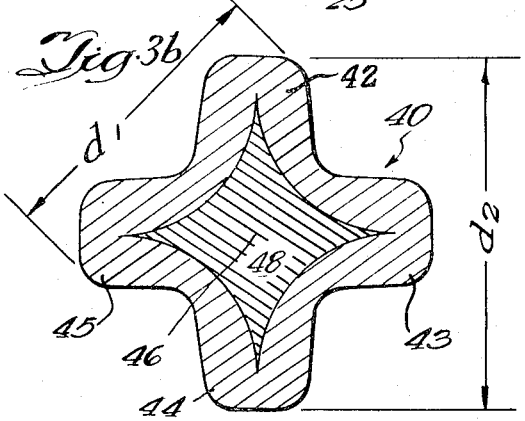
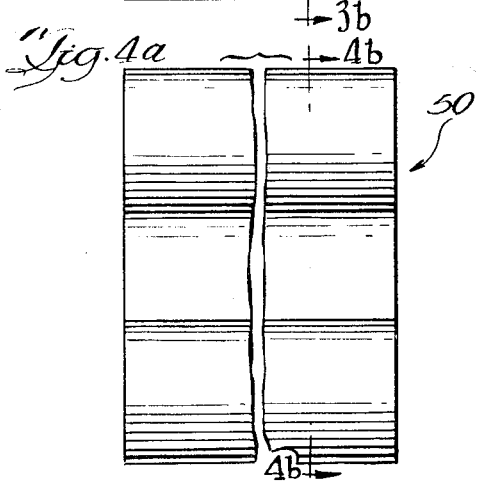
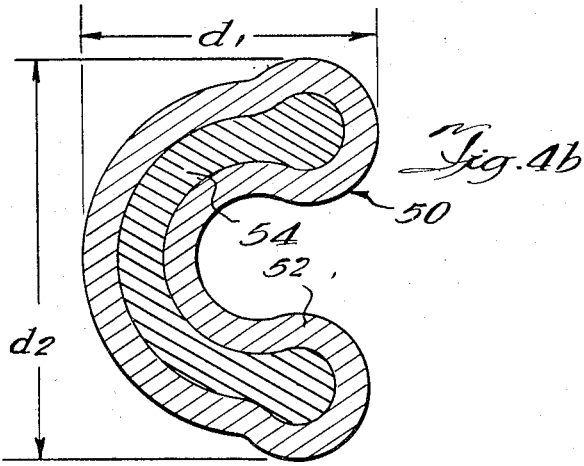

CATALYST FOR HYDROCRACKING A RESID HYDROCARBON

CROSS-REFERENCE

This application is a division of co-pending application Ser. No. 17,454 now U.S. Pat. No. 3,674,680, entitled A PROCESS AND CATALYST FOR HYDROCRACKING A RESID HYDROCARBON and filed Mar. 9, 1970, which in turn is a continuation-in-part of U.S. Ser. No. 598,046 filed Nov. 30, 1966, now abandoned.

BACKGROUND

Resid hydrocarbons are converted to lower boiling hydrocarbons by contacting the resids with a bed of catalyst particles in the presence of hydrogen and at elevated temperatures and pressures. These particles are composed of metallic hydrogenating components supported on an inorganic base, and typically, they have a cylindrical shape with a diameter of about 1/16th of an inch or larger. The resid molecules are large and move into the catalyst particle with difficulty. Most of them penetrate only a shallow increment of catalyst depth from the surface. We have found that metallic contaminants such as nickel, vanadium, and iron contained in the resid are nearly all deposited in the catalyst particle to a depth of about 0.0085 inch from the surface of the particles. This indicates that resid molecules also do not penetrate further than about 0.0085 inch. Thus, catalyst further from the surface is not very effective and might be considered wasted catalyst. If the cylindrical particles are reduced in size to about 0.017 inch in diameter, then all the catalyst is located within 0.0085 inch from the surface of the particle. Such a particle might be said to approach an effectiveness of 1.0. On this basis, a cylindrical particle having a diameter of about one-sixteenth inch is about 55 percent effective. However, as the diameter of the cylindrical particles becomes smaller and approaches the 0.017 inch diameter, a bed of these small catalyst particles will have too high a pressure drop for practical use in a fixed bed hydrocracking or desulfurization process. A high pressure drop can result in catalyst crushing or breaking. In other words, the pressure drop across the bed of catalyst increases with decreasing diameter of the particle.

THE INVENTION

We have found that particles having a predetermined size and geometric configuration will maximize the efficiency of the particle so that most of the catalytic material will be available for hydrocracking or desulfurizing resid hydrocarbons, and at the same time, the void fraction of the catalyst bed will be sufficient to avoid excessively high pressure drops. This catalyst particle of our invention comprises a catalytically active composition useful for converting a resid hydrocarbon to a lower boiling point hydrocarbon. Typically, this catalytically active composition comprises a hydrogenation metallic component of Group VIB and/or VIII of the Periodic Table supported on an inorganic cracking matrix. Our catalyst particle is characterized by having a predetermined size and configuration such that the particle has a surface-to-volume ratio ranging between about 100 and about 250 1/inches and wherein substantially all points within the particle are less than about 0.015 inch from the particle surface. It is desirable to include all particle volume within 0.0085 inch from a catalyst surface, but this can only be approached in a practical extrusion operation. When this particle is circumscribed by a right circular cylinder having an altitude equal to that of the particle, said particle contacts the sidewall of said cylinder at at least three elements and occupies from about 70 to about 90 percent of the volume of said cylinder. Typically, these particles have a diameter ranging from about one-twentieth inch to about one-eighth inch and an altitude of from about one-eighth inch to about five-sixteenths inch. These particles also have a crushing strength of at least about 10 pounds and an abrasion loss of not more than 5 percent. Preferred particle shapes are ring, clover-leaf, cross and C-shaped.

According to the process of our invention, resid hydrocarbons are converted to lower boiling hydrocarbons by contacting, in the presence of hydrogen, the resid hydrocarbons with a bed of the above catalyst particles. The contacting occurs at a temperature of from about 650° to about 875°F., a pressure of about 1,000 to 5,000 psi, and a hydrogen partial pressure of 700 to about 3,500 psi. Hydrogen is added to the reaction zone at the rate of about 3,000 to 50,000 standard cubic feet per barrel of resid hydrocarbon feed, and the liquid hourly space velocity is maintained at about 0.25 to about 5.0 volumes of resid hydrocarbon feed per volume of catalyst. When the catalysts of our invention are placed in the reactor forming a bed of catalyst, the bed has a void fraction between the catalyst particles of about 0.35 to about 0.52.

DESCRIPTION OF THE DRAWINGS

FIG. 1a is a plan view, partially in section, of the ring-shaped catalyst of our invention.

FIG. 1b is a cross-sectional view taken along line 1b—1b of FIG. 1a.

FIG. 2a is a side elevational view of the clover-leaf shaped catalyst of our invention.

FIG. 2b is a cross-sectional view taken along line 2b—2b of FIG. 2a.

FIG. 3a is a wide elevational view of the cross-shaped catalyst of our invention.

FIG. 3b is a cross-sectional view taken along line 3b—3b of FIG. 3a.

FIG. 4a is a side elevational view of the C-shaped catalyst of our invention.

FIG. 4b is a cross-sectional view taken along line 4b—4b of FIG. 4a.

DESCRIPTION OF PREFERRED EMBODIMENTS

Figure 5:
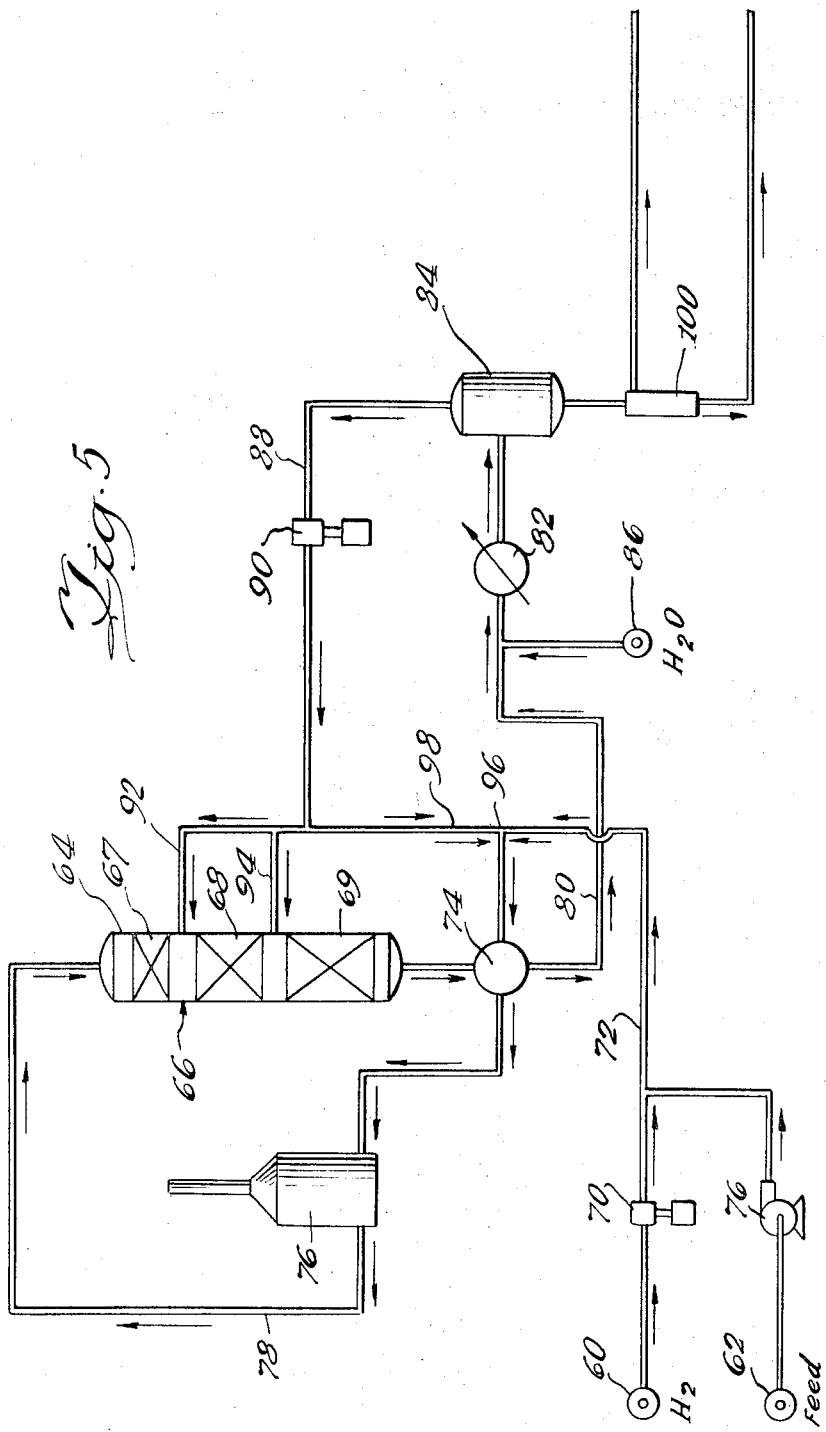
FIG. 5 is a schematic flow diagram showing the process flow and equipment orientation for a resid hydroprocessor using our catalyst.

The ring-shaped catalyst particle 10, as shown in FIGS. 1a and 1b, has an outer wall 12, an inner wall 14, and a continuous external containment layer 16 extending a shallow incremental distance into particle 10 from all surfaces. The inner solid catalyst 18 is substantially inaccessible to the large resid molecules due to diffusional limitations.

The four leaf clover catalyst particle 20, as shown in FIGS. 2a and 2b, includes a central longitudinal member 22 having a substantially circular cross-section. Symmetrically attached to member 22 are substantially similar members 23–26, also having circular cross-sections. The attachments of members 23–26 to central member 22 are at points of tangency to member 22 and extend for a distance on each side of the points of tangency to form appendages 27-30 connecting central member 22 to outer members 23-26. These outer members 23-26 are located about central member 22 at approximately 90° increments from each other. The clover-leaf catalyst has a large surface area for deposition of contaminants so there remain relatively small inaccessible catalyst sections 32-36.

The cross-shaped catalyst particle 40, shown in FIGS. 3a and 3b, includes four arms 42-45 joined together at central section 46. Internal section 48 is designated as catalyst which is inaccessible to the resid molecules. As can be seen, this section 48 is greater than that achieved using a comparable clover leaf design. Nevertheless, the cross-shaped particle provides an excellent resid hydrocracking catalyst.

The C-shaped catalyst particle 50, as shown in FIGS. 4a and 4b, includes an exposed segment 52 and an inaccessible section 54. Inaccessible section 54 will be slightly less than the ring-shaped catalyst particle of comparable size, and would thus be preferred. However, this C-shaped particle is not as strong as the ring-shaped particle and will more readily break apart.

All the catalyst particles shown in FIGS. 1a through 4b have a surface-to-volume ratio ranging between about 100 and about 250 l/inches, and substantially all points within each of said particles are less than about 0.015 inch from the particle's surface. When these particles are circumscribed by a right circular cylinder having an altitude equal to that of the particle, the particle contacts the sidewall of the cylinder at at least 3 elements and occupies from about 70 to about 90 percent of the cylinder volume.

Catalyst Composition

The preferred catalyst composition of the particles comprises a hydrogenation metallic component of Group VIB and/or Group VIII of the Periodic Table on an inorganic-oxide support of a large-pore-diameter alumina having an average pore diameter within the range of about 100 to about 200 angstroms and a surface area within the range of about 150 to about 500 square meters per gram. The combined amounts of the hydrogenation metals are within the range of about 3 to about 35 weight percent based upon said composition. Typically, the hydrogenation metal of Group VIB is molybdenum and the hydrogenation metal of Group VIII is cobalt. When these two metals are the hydrogenation components, the molybdenum should be present in an amount within the range of about 4.5 to about 26 weight percent, calculated as molybdenum trioxide and based upon said composition, and the cobalt should be present in an amount within the range of about 1.3 to about 5.2 weight percent, calculated as cobalt oxide and based upon said composition. A typical embodiment of our catalyst comprises 3 weight percent cobalt and 14 weight percent molybdenum (both metals being calculated as the oxides) on the large-pore-diameter alumina. The catalyst composition may also include a zeolitic molecular sieve suspended in the matrix of the alumina. The molecular sieve may be present in an amount ranging from about 1 to about 50 weight percent based on the combined weight of sieve and alumina. The catalyst composition may also include 0-10 wt.% silica in the alumina matrix. This helps to stabilize the alumina. For further details refer to U.S. Pat. No. 3,393,148.

Catalyst Preparation and Properties

The different catalyst shapes were extruded from the following catalyst composition. The catalyst contains 3 weight percent cobalt oxide (CoO) and 14 weight percent molybdenum oxide ($MoO_3$) on an alumina support of the type disclosed in the U.S. Pat. No. Re. 22,196. The catalyst preparation is as follows: 12 pounds of cobalt nitrate was dissolved in 20 pounds of hot water and blended with 85 pounds of the base which consisted of about 3 pounds of silica and 82 pounds of alumina. The blending was done in a Simpson-Muller blender. To the blend was added 19 pounds of ammonium molybdate in 30 pounds of hot water and the total mixture blended well. The blend was extruded through a ⅜ inch cylindrical hole die in a California Pellet Mill to condition the alumina. The previously extruded mixture was again extruded in a horizontal extruder through a die with the proper shape of holes to produce the shaped catalyst depicted in FIGS. 2a-4b. The extruder was of a type supplied by Bonot or Welding Engineering. The shaped extrudate was then calcined in air at a temperature of about 1,000°F. for 3 hours.

The size of the finished clover leaf catalyst particle 20 was about 0.064 inch diameter and about three-sixteenths inch in average length or altitude. The size of each circular component (members 22-26) of the clover leaf is about 0.21 inch diameter. The size of the cross-shaped catalyst 40 was about 0.053 inch diameter and about 3/16 inch average length or altitude. Each of the four arms 42-45 has a breadth of about 0.017 inch. The C-shaped catalyst 50 is about 0.053 inch vertically and about 0.042 inch in horizontal dimension, and the length or altitude is about three-sixteenths inch. A ring-shaped catalyst particle as depicted in FIGS. 1a and 1b can be made having about the same dimensions as the C-shaped particle. These dimensions and other catalyst properties are given in the following Table I.

TABLE I

| Size (inch) | Clover Leaf | Cross | "C" |
|---|---|---|---|
| $d_1$ | .052 | .044 | .042 |
| $d_2$ | .064 | .053 | .053 |
| Bulk Density (gm/cc) | 0.54 | 0.54 | 0.50 |
| * Crushing Strength (lbs. avg. of 100) | 28 | 30 | 10 |
| ** Abrasion Loss (Wt.%) | 3 | 4 | 5 |

* In the Crushing Strength Test, an extruded particle was placed on its side between two parallel, horizontal flat plates, one stationary and one movable. A gradually increasing force was applied to the movable plate perpendicular to the surface of the plate, until the particle broke. The crushing strength is the force in pounds applied at the instant particle breakage occurs. The crushing strength reported in accordance with industry specifications is the average value determined on at least 100 particles. The crushing test strength is related to the ability of the catalyst to withstand pressure drops and to support the catalyst bed in the reactor.

** In the Abrasion Loss Test, about 100 grams of extruded catalyst was loaded into a metal cylinder 10 inches in diameter and 6 inches high. The metal cylinder contained one radial baffle 5.5 inches long which extended 2 inches from the side toward the axis of the cylinder. The cover was replaced and the cylinder was rotated about the horizontal longitudinal axis at 60 rpm for thirty minutes. At the end of the test the catalyst charge was sieved through a 20 mesh screen and that which remained on the screen was weighed. The difference between the weight of the catalyst that remained on the screen and the original 100 gram weight of the sample is reported as the weight percent loss on abrasion.

RESID HYDROCRACKING PROCESS

Our improved resid hydrocracking process is depicted schematically in FIG. 5. Hydrogen rich gas from source 60 and resid feed from source 62 are mixed together and fed into top 64 of reactor 66. This reactor 66 contains three separate fixed beds 67–69 of catalyst particles as described above. The beds 67–69 can be composed of all the same type of particle, for example, clover-leaf, or each bed can be of a different type or be composed of mixtures of different types. These beds 67–69, because of the size and shape of the catalyst particles, have high void fractions ranging between about 0.35 and about 0.52. Usually, the turbulent flow pressure drop across a bed is proportional to $(1-e)/e^3$. This is according to the well known Ergun equation where $e$ is the fraction void between the particles.

These beds 67–69 are initially pretreated by, first, heating the beds in a nitrogen atmosphere at about 700°F., and secondly, contacting the beds with a mixture of 92 mole percent hydrogen and 8 percent mole hydrogen sulfide at a temperature of about 600° to about 750°F. and a pressure of about 100 to about 300 psi for 2 hours. The conditions maintained in reactor 66 during hydrocracking of the resid feed are listed below in Table II, and properties of various resid feeds are listed below in Table III.

TABLE II

| | Preferred | Optimum |
|---|---|---|
| Temperature (°F) | 650–875 | 720–830 |
| Liquid Hourly Space Velocity (volume of resid feed per volume of catalyst) | 0.25–5.0 | 0.5–1.5 |
| $H_2$ Addition Rate of Reactor (standard cubic feet per barrel of resid hydrocracking feed) | 3,000–50,000 | 5,000–10,000 |
| Total Pressure (lbs. per square inch absolute, psia) | 1,000–5,000 | 1,200–2,400 |
| $H_2$ Partial Pressure (lbs. per square inch absolute, psia) | 700–3,500 | 1,000–1,650 |

TABLE III

| Crude Source | Cyrus | Darius | El Morgan | Mixed, West Texas and Wyoming |
|---|---|---|---|---|
| Sulfur, wt.% | 4.52 | 4.05 | 2.47 | 4.0 |
| Pour Point, °F. | 95 | 65 | 95 | 125 |
| Viscosity, SSF | 1600 at 210°F. | 113 at 122°F. | 139 at 122°F. | 2,039 at 210°F. |
| Vanadium, ppm | 230 | 50 | 94 | 138 |
| Nickel, ppm | 70 | 13 | 47 | 45 |
| Vol.% on Crude | 69.8 | 43.5 | 52.4 | 20.3 |
| Gravity, °API | 9.4 | 15.9 | 17.4 | 5.8 |
| Boiling Range, vol.% | | | | |
| 650°F– TBP | 7.3 | 6.6 | 6.7 | |
| 650°–1040°F TBP | 29.0 | 45.9 | 50.1 | 5.0 |
| 1040°F+ | 63.7 | 47.5 | 43.2 | 95.0 |
| Total | 100.0 | 100.0 | 100.0 | 100.0 |

Hydrogen rich gas flows into compressor 70 which forwards compressed gas along line 72 to heat exchanger 74. Pump 76 forwards resid feed to heat exchanger 74 also along line 72 so that the hydrogen rich gas and resid are thoroughly mixed before they are fed into heater 76. The effluent from heater 76 flows along line 78 into reactor 66 and percolates downwardly through the three fixed beds 67–69.

As the resid feed and hydrogen gas contact the particles of catalyst in beds 67–69, the resid feed is cracked into lower boiling hydrocarbons and/or desulfurized and the metallic components in the feed are deposited in the catalyst particles. The effluent from reactor 66 flows through heat exchanger 74 and along line 80 into cooler 82 and thence into vapor-liquid separator 84. Water from source 86 is added to this effluent before the effluent flows into cooler 82 to wash the effluent, dissolving therein ammonia and hydrogen sulfide gases produced during the hydrocracking reaction in reactor 66.

Vapor leaves the top of separator 84 and flows through line 88 into compressor 90 where it is recycled to reactor 66 via lines 92 and 94. This recycled vapor is used to control the temperature within reactor 66. Recycled vapor is also mixed with resid feed and hydrogen rich gas at junction 96 between lines 72 and 98.

Liquid product is removed from the bottom of separator 84 and fed into water coalescer 100 which separates hydrocarbon materials from the wash water. The hydrocarbons are then forwarded to a fractionating tower which separates low boiling components from high boiling components.

Example

The clover-leaf shaped catalyst, as previously described, was placed in a bench scale reactor and utilized to hydroprocess the Cyrus atmosphere resid. The reactor was operated for more than 1,800 hours without shutdown and a feed rate corresponding to a LHSV of 0.54, a hydrogen rate of about 8,000 SCFB, an average temperature from 767°F. to 802°F., and a pressure of about 1,300 PSIA. The percent of feed sulfur converted to $H_2S$ varied from 66 to 85 percent. The conversion of feed boiling above 650°F. to products boiling below 650°F. was typically 27 vol.%. Products from this treatment were typically as follows:

| | Weight Percent of Feed |
|---|---|
| $H_2$ | −1.66 |
| $H_2S$ | 4.71 |
| $NH_3$ | .23 |
| $C_1$ | .72 |
| $C_2$ | .52 |
| $C_3$ | .26 |
| $iC_4$ | .10 |
| $nC_4$ | .18 |
| $C_5$–360°F. ABP | 3.08 |
| 360°–650°F. ABP | 25.92 |
| 650+ | 65.94 |
| | 100.00 |

We claim:

1. A catalyst particle comprising a catalytically active composition useful for desulfurizing a resid hydrocarbon and/or converting a resid hydrocarbon to a lower boiling hydrocarbon, said catalyst particle characterized by having a size and configuration such that substantially all points within the particle are less than about 0.015 inch from the particle surface and the particle has a surface-to-volume ratio ranging between about 100 and about 250 reciprocal inches and when said particle is circumscribed by a right circular cylinder having an altitude essentially equal to that of the particle, said particle contacts the sidewall of said cylinder at at least 3 elements and occupies from about 70 to about 90 percent of the volume of said cylinder, and the diameter of the particle is from about one-twentieth to about one-eighth inch and the altitude of the particle is from about one-eighth to about five-sixteenths inch.

2. The particle of claim 1 having a crushing strength of at least about 10 pounds and an abrasion loss of not more than about 5 percent.

3. The particle of claim 1 generally having a ring shape.

4. The particle of claim 1 generally having a cloverleaf shape.

5. The particle of claim 1 generally having a cross shape.

6. The particle of claim 1 generally having a C-shape.

7. The particle of claim 1 wherein said catalytically active composition comprises a hydrogenation metal compound of a metal selected from the group consisting of Group VIB, Group VIII of the Periodic Table and mixtures thereof supported on an inorganic cracking matrix.

* * * * *

PO-1050
(5/69)

UNITED STATES PATENT OFFICE
CERTIFICATE OF CORRECTION

Patent No. 3,764,565            Dated October 9, 1973

Inventor(s) GERALD B. HOEKSTRA and ROBERT B. JACOBS

It is certified that error appears in the above-identified patent and that said Letters Patent are hereby corrected as shown below:

Title page, "Inventors: Robert B. Jacobs, Homewood;
                         Gerald B. Holkstra, South Holland,"
    should be
       -- Inventors: Gerald B. Hoekstra, South Holland;
                        Robert B. Jacobs, Homewood, --.

Column 2, line 42, "wide" should be -- side --.

Column 5, line 21, "8 percent mole" should be -- 8 mole percent --.

Signed and sealed this 9th day of July 1974.

(SEAL)
Attest:

McCOY M. GIBSON, JR.                         C. MARSHALL DANN
Attesting Officer                              Commissioner of Patents